(12) United States Patent
Foltin

(10) Patent No.: US 9,580,005 B2
(45) Date of Patent: Feb. 28, 2017

(54) METHOD AND CONTROL UNIT FOR SETTING A CHARACTERISTIC OF A LIGHT EMISSION OF AT LEAST ONE HEADLIGHT OF A VEHICLE

(71) Applicant: Robert Bosch GmbH, Stuttgart (DE)

(72) Inventor: Johannes Ludwig Foltin, Ditzingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/964,947

(22) Filed: Dec. 10, 2015

(65) Prior Publication Data

US 2016/0167567 A1 Jun. 16, 2016

(30) Foreign Application Priority Data

Dec. 11, 2014 (DE) .................. 10 2014 225 513

(51) Int. Cl.
 *B60Q 1/26* (2006.01)
 *B60Q 1/08* (2006.01)
 *B60Q 1/115* (2006.01)
 *B60Q 1/14* (2006.01)

(52) U.S. Cl.
 CPC .............. *B60Q 1/085* (2013.01); *B60Q 1/115* (2013.01); *B60Q 1/143* (2013.01); *B60Q 2300/324* (2013.01); *B60Q 2300/41* (2013.01)

(58) Field of Classification Search
 CPC .......... H05B 33/08; H05B 37/02; B60Q 3/02
 USPC ........................................ 315/77–80, 82–83
 See application file for complete search history.

(56) References Cited

U.S. PATENT DOCUMENTS

| 2005/0116964 A1* | 6/2005 | Kotake | G06T 15/205 345/629 |
| 2012/0018989 A1* | 1/2012 | Breed | B60R 21/01516 280/735 |
| 2014/0125227 A1* | 5/2014 | Ehlgen | G06T 7/403 315/82 |

* cited by examiner

*Primary Examiner* — Mindh D A
(74) *Attorney, Agent, or Firm* — Gerard Messina

(57) ABSTRACT

A method for setting a characteristic of a light emission of at least one headlight of a vehicle includes reading in topology data which represent a topology of the surroundings of the vehicle. The method also includes ascertaining a visual range difference between a topology-related first visual range which is associated with a first characteristic of the light emission, and a topology-related second visual range which is associated with a second characteristic of the light emission, using the topology data. Finally, the method includes adapting a waiting time period for changing a characteristic of the light emission as a function of the visual range difference.

12 Claims, 3 Drawing Sheets

METHOD AND CONTROL UNIT FOR SETTING A CHARACTERISTIC OF A LIGHT EMISSION OF AT LEAST ONE HEADLIGHT OF A VEHICLE

RELATED APPLICATION INFORMATION

The present application claims priority to and the benefit of German patent application no. 10 2014 225 513.9, which was filed in Germany on Dec. 11, 2014, the disclosure of which is incorporated herein by reference.

FIELD OF THE INVENTION

The present invention relates to a method for setting a characteristic of a light emission of at least one headlight of a vehicle, a corresponding control unit, and a corresponding computer program.

BACKGROUND INFORMATION

High beam assistance systems may adapt a light distribution to an environmental situation. A customary high beam assist (HBA) may automatically switch over between low-beam light and high-beam light, and adaptive systems may dynamically adapt the light distribution to a traffic situation. Adaptive systems include, for example, assistance systems such as adaptive high beam control (AHC), adaptive cut-off line (aCOL), or adaptive light-dark cutoff, which, similar to headlight leveling control, may raise a light-dark cutoff of a headlight just high enough so that other road users are not blinded. Continuous high beam control (CHC), or vertical cut-off line (vCOL), may generate a light distribution which is similar to high-beam light, whereby a shared shadow corridor is generatable around road users or groups of road users in order to shield them in a targeted manner. The so-called "matrix beam" or the so-called "pixel light" may generate independent shadow corridors for multiple road users. In addition, it is possible, based on information concerning the surroundings, to switch on specific static light distributions such as city light, expressway light, or rural roadway light.

SUMMARY OF THE INVENTION

Against this background, with the approach provided here, a method for setting a characteristic of a light emission of at least one headlight of a vehicle, a control unit which uses this method, and lastly, a corresponding computer program, according to the main claims are provided. Advantageous embodiments result from the respective subclaims and the following description.

According to specific embodiments of the present invention, in particular a debouncing time for headlights may be adapted to a visual range difference between visual ranges for different light emission characteristics or light distributions, for example low-beam light and high-beam light. In other words, in particular a visual range of a driver for various light distributions may be determined using a topology of vehicle surroundings or a roadway topology, whereby a high beam assist may be adapted to a difference of the visual ranges or ranges which result for the various light distributions. Thus, for example, a high beam assist may be set based on a visual range difference between two different light distributions. A difference of the visual range between different light distributions, for example low-beam light and high-beam light, may be evaluated in order to adapt a high beam assist. For a small visual range difference between different light distributions, for example a long waiting time for switching over between light emission characteristics may be set, and for a large difference between different light distributions, a short waiting time may be set. A configuration of a high beam assist may thus be adapted to a visual range difference between different light distributions.

According to specific embodiments of the present invention, for example a relationship between comfort and visual range for vehicle drivers may be advantageously improved, a change of a light emission characteristic or light distribution being made more quickly or in an accelerated manner for a visual range improvement to be expected. In addition, in particular depending on topological surroundings conditions, a light emission from vehicle headlights which is comfortable as well as optimized for the visual range may be reliably achieved. For example, a waiting time after another vehicle disappears until turning the headlights back up may be meaningfully set to instantaneous light distribution options with regard to an advantageous compromise between comfort and visual range. Thus, for example, a switchover to high-beam light or a similar characteristic of the light emission may then be made quickly when this also has a certain benefit for the driver, for example for a straight course of the roadway prior to a sharp curve. In addition, the waiting time may be set to "long" when there would be no benefit to the driver by an early setting of a high-beam light distribution or a distribution similar to high beam light, for example immediately prior to a sharp curve. For this purpose, adaptive high beam assists, in particular their controller settings, may also easily have a suitable configuration.

A method for setting a characteristic of a light emission of at least one headlight of a vehicle is provided, the method including the following steps:

reading in topology data which represent a topology of the surroundings of the vehicle;

ascertaining a visual range difference between a topology-related first visual range which is associated with a first characteristic of the light emission, and a topology-related second visual range which is associated with a second characteristic of the light emission, using the topology data; and adapting a waiting time period for changing a characteristic of the light emission as a function of the visual range difference.

The vehicle may be a road-bound vehicle, in particular a motor vehicle such as a passenger vehicle, a truck, a motorcycle, a commercial vehicle, or the like. The vehicle may be situated on a roadway or street. The characteristic of the light emission may represent a light distribution, a light intensity distribution, or the like. When the characteristic of the light emission is changed, the light emission may be modified discretely, quasi-continuously, or continuously. The first characteristic may be a low-beam light characteristic or a characteristic which is similar to low-beam light. The second characteristic may be a high-beam light characteristic or a characteristic which is similar to high-beam light. The second characteristic may be a target characteristic of the light emission which is to be achieved by the change. The first characteristic and the second characteristic may be selected from a group of at least two characteristics. The topology data may represent a topology of the roadway or street on which the vehicle is situated, and/or of a segment of the surroundings adjoining the roadway or street. A visual range may be a maximum visual range from the vehicle on the roadway or street in a segment of the surroundings situated in the forward travel direction of the vehicle. A visual range may represent a distance from the vehicle to a point on a trajectory of the vehicle, which corresponds to a maximum visual range. The topology-related first visual range may be computed using the topology data, and the topology-related second visual range may be computed using the topology data.

According to one specific embodiment, the waiting time period may be set to a first waiting time period in the step of adapting when a magnitude of the visual range difference is less than a threshold value. Similarly, the waiting time period may be set to a second waiting time period when a magnitude of the visual range difference is greater than the threshold value, the first waiting time period being longer than the second waiting time period. The waiting time period may be set directly via a time offset, or indirectly via a controller time constant. Such a specific embodiment offers the advantage that the light emission is changed only when this results in an improvement in the visibility or visual range for a driver. An erratic light emission due to unnecessary changes may thus be avoided.

In addition, a target characteristic for changing a characteristic of the light emission may be adapted as a function of the visual range difference in the step of adapting. A light distribution or characteristic of the light emission may thus be set which is optimally coordinated with topology-related visibility conditions.

In addition, the topology-related visual ranges may be computed in the step of ascertaining, using a geometric range of the at least one headlight, a light distribution of the at least one headlight, a beam angle of the at least one headlight, a geometric visibility distance, a meteorological visibility distance, a recognizability distance, and additionally or alternatively, using navigation data. A visual range may be ascertained, for example, using a roadway trajectory based on navigation information. Such a specific embodiment offers the advantage that reliable, meaningful values may be ascertained for the visual ranges, even under different surroundings conditions.

Furthermore, at least one further visual range difference may be ascertained in the step of ascertaining. The at least one further visual range difference between the first visual range or the second visual range, and at least one further visual range which is associated with a further characteristic of the light emission which is different from the first characteristic and the second characteristic, or between at least two further visual ranges which are associated with different further characteristics of the light emission which are different from the first characteristic and the second characteristic, may be ascertained. The waiting time period may be set in the step of adapting as a function of an absolute value maximum visual range difference between the visual range difference and the at least one further visual range difference. Thus, for changing the light emission, the second characteristic or a further characteristic of the light emission may be used as a target characteristic. The most advantageous characteristic of the light distribution may thus be set, even for multiple different characteristics which are possible as a target setting or available for selection, with regard to the visual range resulting from same for a given topology.

In addition, the method may include a step of determining the topology data. The topology data may be determined using surroundings data which represent at least one property of the surroundings of the vehicle. The surroundings data may represent geodata, image data, sensor data, and additionally or alternatively, other data which are descriptive of the topology. Such a specific embodiment offers the advantage that the surroundings of the vehicle may be topologically detected or determined in a particularly precise, accurate, and reliable manner.

The method may also include a step of receiving the surroundings data from at least one interface with a position detection unit, a vehicle camera, a data transmission unit, a surroundings detection unit, and additionally or alternatively a travel data detection unit, of the vehicle. The data transmission unit may be configured for receiving the surroundings data from a unit external to the vehicle, and additionally or alternatively, from a unit internal to the vehicle, for example from a remote data source via a wireless data link. Such a specific embodiment offers the advantage that various options for data collection may be utilized, in combination or separately, depending on the application and the actual presence of units, in order to obtain reliable, accurate surroundings data as a basis for determining the topology.

Optionally, the surroundings data may include concealment information or concealment data regarding at least one concealed object situated in the surroundings of the vehicle, for example adjoining a roadway or street on which the vehicle is situated. The concealment information may represent a position, a pattern, and additionally or alternatively, a distance of the at least one concealed object relative to a roadway, and additionally or alternatively relative to the vehicle. The concealment information may represent a vegetation signal or the like, and may be ascertained, for example, from image data of a vehicle camera, from navigation data, or the like. In particular, the concealment information may represent a simple vegetation signal which may be provided by a position detection unit, for example, when the vehicle is within a forest, for example. A topology of the surroundings may thus be determined even more accurately.

In addition, the method may include a step of changing the characteristic of the light emission as a function of the adapted waiting time period or as a function of the ascertained visual range difference and the adapted waiting time period in a discrete or continuous state transition. The characteristic of the light emission may be changed from the first characteristic to the second characteristic or to a further characteristic which is different from the first characteristic and the second characteristic. Similarly, the characteristic of the light emission may be changed from the second characteristic to the first characteristic or to a further characteristic which is different from the first characteristic and the second characteristic. Similarly, the characteristic of the light emission may be changed from a further characteristic, which is different from the first characteristic and the second characteristic, to the first characteristic or to the second characteristic, or between different further characteristics which are different from the first characteristic and the second characteristic. Such a specific embodiment offers the advantage that a change of the light emission which is improved with regard to safety and comfort may be achieved, since a characteristic may be set which is the most advantageous and meaningful with regard to prevailing topology in the surroundings.

The approach provided here also provides a control unit which is configured for carrying out, controlling, or implementing the steps of one variant of a method provided here in appropriate units. The underlying object of the present invention may also be quickly and efficiently achieved by this embodiment variant of the present invention.

In the present context, a control unit may be understood to mean an electrical device which processes sensor signals and outputs control and/or data signals as a function thereof. The control unit may include an interface which may have a hardware and/or software configuration. In a hardware configuration, the interfaces may be part of a so-called system ASIC, for example, which contains various functions of the control unit. However, it is also possible for the interfaces to be dedicated, integrated circuits, or to be at least partially made up of discrete components. In a software configuration, the interfaces may be software modules which are present on a microcontroller, for example, in addition to other software modules.

Also advantageous is a computer program product or a computer program having program code which may be stored on a machine-readable carrier or memory medium such as a semiconductor memory, a hard disk memory, or an optical memory, and used for carrying out, implementing, and/or controlling the steps of the method according to one of the specific embodiments described above, in particular when the program product or program is executed on a computer or a device.

An advantageous approach may thus be found for the mutually dependent objectives of visual range, blinding, and comfort. Rapid changes between light distributions may distract the driver, for which reason a delay in a switchover may be implemented. In adaptive systems, this could mean low pass filtering of an output signal or a slow controller configuration, for example. A high beam assist may be configured for delaying turning up the headlights when temporarily concealed road users result in immediate headlight dimming when they appear after the headlights have been turned up, and additionally or alternatively, for delaying headlight dimming and setting a minimum high-beam light duration. For acceptance and favorable assessment of a high beam assist by customers, not only smooth dynamics, for example avoiding discomfort from so-called flicker or erratic changes, but also the visual range, for example avoiding discomfort from insufficient stimulation or a too small minimum visual range, play a role. The visual range is essential for driving a vehicle, and likewise has an influence on the feeling of comfort or discomfort by the driver. The term "blinding" may refer to blinding of other road users. Blinding of the driver of the host vehicle may have different forms and components: As the result of so-called veiling luminance, physiological blinding may reduce a contrast of a perceived image, and thus, an actual recognizability distance or visual range. Psychological blinding may cause an unpleasant feeling in blinded persons, but has no effect on visual function, which is addressed by physiological blinding. Physiological blinding ("disability glare") may have an effect on the visual function. Physiological blinding and psychological blinding ("discomfort glare") may occur together, for example.

High beam assists may utilize information concerning the surroundings, for example continuous roadway illumination such as in a city or a structural separation on an expressway, as well as an existing traffic situation, for example preceding vehicles, oncoming vehicles, etc., in order to adapt a system response. For example, during travel past a single oncoming vehicle, the headlights may be turned back up more quickly in order to rapidly provide a driver with better visibility or a larger visual range due to a better light distribution, for example high-beam light instead of low-beam light. If a preceding vehicle suddenly disappears, the waiting time may be longer than for a vehicle traveling past, since the former vehicle could be temporarily concealed. Due to an extended waiting time, temporary turning up of the headlights may be prevented, since the other vehicle could immediately become visible again, for example during continued travel along a curve. A long waiting time may be set on roadways having a structural separation, since headlights of other vehicles may be infrequently visible, for example, and therefore longer time periods may be present between detection times. Due to a long waiting time, frequent switching over between low-beam light and high-beam light may be prevented and comfort may be increased, and blinding of other drivers, in particular truck drivers sitting in an elevated position, may be avoided. Temporary turning up of the headlights, which would result in a flickering sensation, may be avoided. Temporary turning up of the headlights may be recognized by a vehicle camera system, so that a minimum low-beam light duration may be set in order to calm a controller response of a high beam assist and increase comfort. In adaptive systems, which may generate quasi-continuous light distributions, a short waiting time may generally correspond to a small controller time constant, and thus, a rapid, dynamic response, and a longer waiting time may generally correspond to a large controller time constant, and thus, a slow, calm response.

The approach provided here is explained in greater detail below by way of example, with reference to the appended drawings.

DETAILED DESCRIPTION

Figure 1:
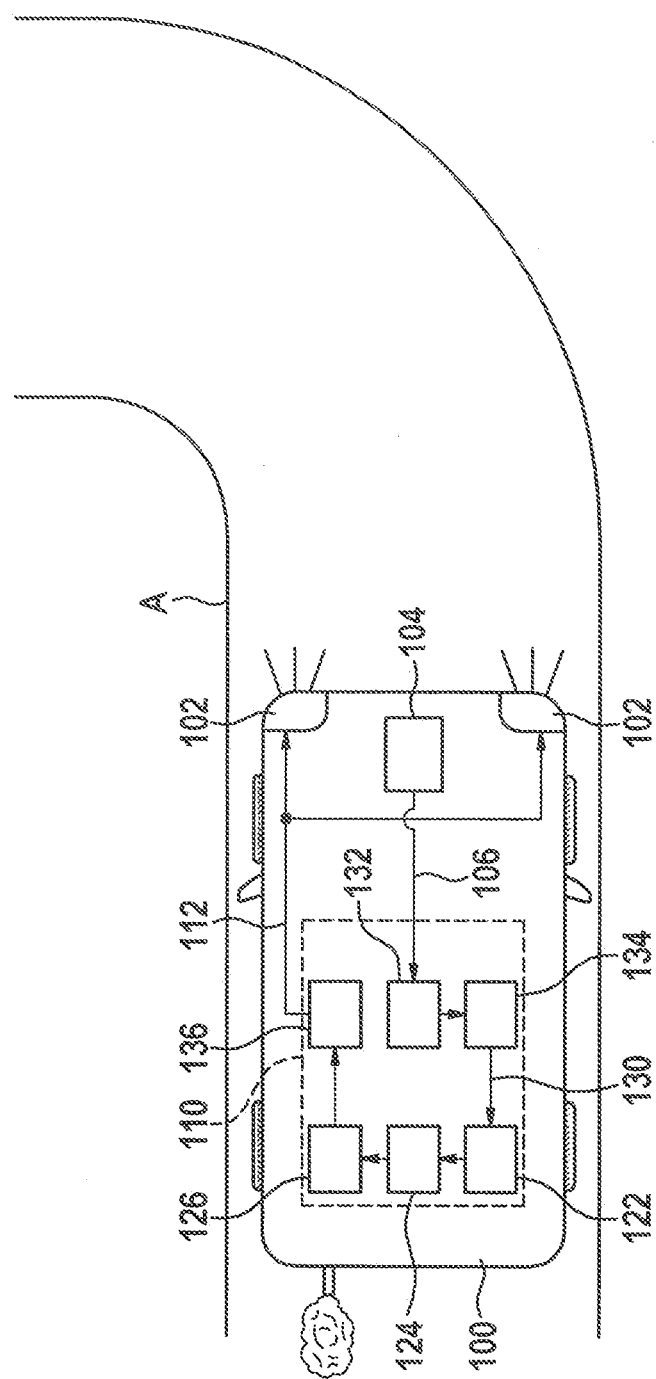
FIG. 1 shows a schematic illustration of a vehicle which includes a control unit according to one exemplary embodiment of the present invention, in a surroundings.

In the following description of advantageous exemplary embodiments of the present invention, identical or similar reference numerals are used for the elements having a similar action which are illustrated in the various figures, and a repeated description of these elements is dispensed with.

For the purpose of simplification and readability, exemplary embodiments are sometimes described in particular with regard to classical high beam assists, use also being provided for adaptive systems, resulting in a change in system dynamics. In adaptive systems, a short waiting time period corresponds to a rapid system response, as the result of which, for example, a change of a characteristic of the light emission takes place more quickly, and a long waiting time period corresponds to a slower, more sluggish system response, as the result of which a change of a characteristic of the light emission takes place later or more slowly.

FIG. 1 shows a schematic illustration of a vehicle 100 which includes a control unit according to one exemplary embodiment of the present invention, in a surroundings. Vehicle 100 is a motor vehicle in the form of a passenger vehicle. Vehicle 100 is situated on a street or roadway A. The surroundings of vehicle 100 thus include roadway A. Roadway A has a pattern which is a function of the topology of the surroundings. In particular, roadway A has a pattern which deviates from a linear pattern, for example a curve, and additionally or alternatively has an inclination.

Vehicle 100 includes two headlights 102 solely as an example. Headlights 102 are front headlights. Headlights 102 are controllable in order to generate a light emission. In the process, a characteristic of the light emission is changeable. For example, headlights 102 are controllable in order to generate a light emission which is changeable between a first characteristic and a second characteristic. The first characteristic is, for example, a low-beam light characteristic and the second characteristic is, for example, a high-beam light characteristic. According to the exemplary embodiment of the present invention illustrated in FIG. 1, the first characteristic is set instantaneously, for example.

Vehicle 100 also has a surroundings data detection unit 104. Surroundings data detection unit 104 is configured for detecting surroundings data 106 which represent at least one property of the surroundings of the vehicle. For example, surroundings data detection unit 104 is configured as a position detection unit, a vehicle camera, a data transmission unit, a surroundings detection unit, e.g., a surroundings sensor, or a travel data detection unit. Optionally, vehicle 100 may include a plurality of surroundings data detection units 104 which may have different configurations. Surroundings data detection unit 104 is configured for providing surroundings data 106, in particular via an interface, for example a cable or a wireless data link.

In addition, vehicle 100 includes the control unit, which is referred to below as a setting device 110. Setting device 110 is configured for setting a characteristic of a light emission of headlights 102 of vehicle 100. Setting device 110 according to the exemplary embodiment of the present invention illustrated in FIG. 1 is configured for receiving and reading in surroundings data 106. In addition, setting device 110 is configured for outputting or providing a control signal 112 for controlling headlights 102. In particular, setting device 110 is configured for generating control signal 112, using surroundings data 106. Setting device 110 is configured for outputting control signal 112 to headlights 102 or to a control device, not illustrated in FIG. 1, for controlling headlights 102.

Setting device 110 includes a reader unit 122, an ascertainment unit 124, and an adaptation unit 126. Reader unit 122 is configured for reading in topology data 130, which represent a topology of the surroundings of vehicle 100. Topology data 130 are determined or generated using surroundings data 106. Ascertainment unit 124 of setting device 110 is configured for ascertaining a visual range difference, using topology data 130. Ascertainment unit 124 is configured for ascertaining the visual range difference between a topology-related first visual range, which is associated with a first characteristic of the light emission, and a topology-related second visual range which is associated with a second characteristic of the light emission. For this purpose, ascertainment unit 124 is configured for computing or approximating the first visual range and the second visual range, using topology data 130. The first characteristic of the light emission represents, solely as an example, a low-beam light characteristic, and the second characteristic of the light emission represents, solely as an example, a high-beam light characteristic. Adaptation unit 126 of setting device 110 is configured for adapting or modifying a waiting time period for changing a characteristic or an instantaneously set characteristic of the light emission as a function of the ascertained visual range difference. The characteristic of the light emission is changeable as a function of the adapted waiting time period.

According to one exemplary embodiment, adaptation unit 126 is configured for setting a first waiting time period in the case of a first magnitude of the ascertained visual range difference which is less than a threshold value. A waiting time period refers, solely as an example, to a switchover from low-beam light as the first characteristic, to high-beam light as the second characteristic, of the light emission. In addition, adaptation unit 126 is configured for setting a second waiting time period in the case of a second magnitude of the ascertained visual range difference which is greater than a threshold value. The first waiting time period is longer than the second waiting time period. Thus, for a small visual range difference, which would result when the light emission is changed from the first characteristic to the second characteristic, or when the headlights are turned up, a long waiting time period is set. For a potentially large visual range difference, which is achievable by turning up the headlights, having the second magnitude, a short waiting time period for turning up the headlights is set.

Ascertainment unit 124 is optionally configured for computing the topology-related visual ranges, using a geometric range of headlights 102, a light distribution of headlights 102, a beam angle of headlights 102, a geometric visibility distance, a meteorological visibility distance, a recognizability distance, and additionally or alternatively, using navigation data. The visual ranges refer, for example, to a distance of vehicle 100 from reference points on roadway A in the forward travel direction ahead of vehicle 100.

According to one exemplary embodiment, setting device 110 also includes a receiving unit 132. Receiving unit 132 is configured for receiving surroundings data 106 from surroundings data detection unit 104. Setting device 110 also includes a determination unit 134. Determination unit 134 is configured for determining topology data 130, using surroundings data 106. Determination unit 134 is also configured for outputting determined topology data 130 to reader unit 122. In addition, according to one exemplary embodiment, setting device 110 includes a change unit 136. Change unit 136 is configured for changing the characteristic of the light emission, using, or as a function of, the adapted waiting time period or as a function of the ascertained visual range difference and the adapted waiting time period. For this purpose, change unit 136 is configured for generating and providing control signal 112. Change unit 136 is configured in particular for changing the characteristic of the light emission in a discrete or continuous state transition.

Figure 2:
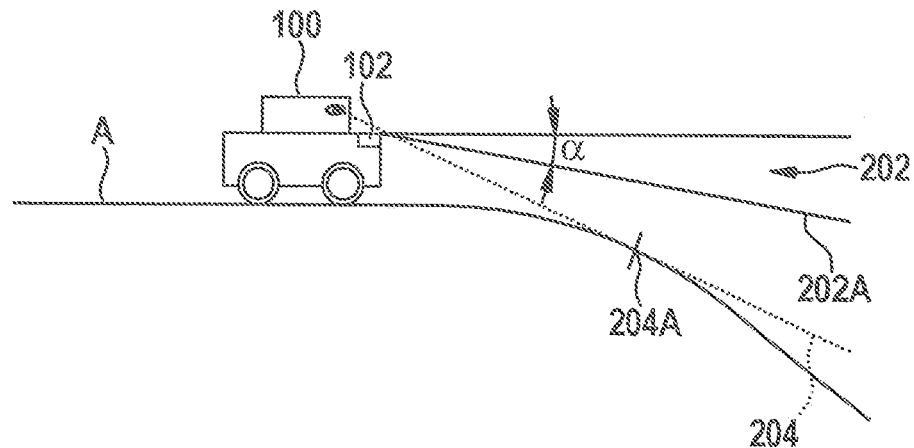
FIG. 2 shows a schematic illustration of the vehicle from FIG. 1 in a surroundings.

FIG. 2 shows a schematic illustration of vehicle 100 from FIG. 1 in a surroundings. Due to the illustration and for the sake of clarity, FIG. 2 shows only one headlight 102 of vehicle 100, vehicle 100 being shown in a side view. Vehicle 100 is situated on roadway A. Roadway A has a downhill grade in the forward travel direction ahead of vehicle 100. In addition, FIG. 2 shows a characteristic of a light distribution, or light emission 202, generated by headlight 102 in the form of a light cone having a beam angle α, a light-dark cutoff 202A, and a vision beam 204 from an eye of a driver, symbolically depicted, in vehicle 100 on roadway A, a contact point 204A of vision beam 204, tangentially situated on roadway A in an area ahead of vehicle 100, with roadway A also being depicted in FIG. 2. Light emission 202 or the light cone of headlight 102 is situated at a distance due to the downhill grade of roadway A. Contact point 204A represents a maximum possible visual range of a driver of vehicle 100. FIG. 2 depicts how the ascertainment unit of the setting device of vehicle 100 may ascertain a visual range.

In other words, FIG. 2 illustrates a difference between a geometric visual range of a driver of vehicle 100 and a geometric range of headlight 102. In FIG. 2, light-dark cutoff 202A of headlight 102 has no intersection point with a surface of roadway A, and a visual range is ascertained via geometric relationships between the driver's eye and the roadway surface. In FIG. 2, due to the lack of an intersection point of light-dark cutoff 202A with roadway A, a geometric range of headlight 102 is greater than a geometric visual range of the driver, up to contact point 204A. The ascertainment unit of the setting device is advantageously configured for ascertaining the geometric range of the driver in the present case.

Alternatively, the visual range may be a recognizability distance, i.e., a maximum distance in which a driver may recognize an object in the surroundings of vehicle 100 and identify such an object in front of a background. The recognizability distance is a function of the size and the contrast of the object in front of the background or a luminance thereof. The geometric range of headlights 102 may also be used or ascertained as the visual range. The geometric range represents an intersection point of light-dark cutoff 202A with a surface of street or roadway A. For low-beam light, the range is stated as 65 meters, for example, which results from a headlight mounting height of 65 cm, for example, and a headlight inclination of 1 percent, or a beam angle α of 0.57 degree for a flat roadway. The geometric range is shortened for a roadway A which ascends ahead of vehicle 100, and is extended for a descending roadway A, the latter case being shown in FIG. 2, and the former case being shown in FIG. 3. Accordingly, there is a dependency of the geometric range on the topography of the surroundings, in particular of roadway A. The geometric range may be ascertained as the visual range when concealments are likewise taken into account. For example, for a descending roadway A, the visual range may be under the geometric range, for example in the area of a hilltop. If the geometric range is to be ascertained as the visual range, in addition to utilizing the geometric range of headlights 102, the geometric visibility conditions may also be taken into account.

In addition to the geometric visual range, a so-called isolux line, for example based on 1 lux, on the roadway may be ascertained. The visual range may be assumed, for example, as an average value of distances from an intersection point of the isolux line with a left and a right lane marking for a straight roadway A. Modified methods may also be used: for example, the intersection point with one or multiple planes in parallel with the roadway surface may be utilized, or the planes may be adapted to a roadway topology, in particular taking a vehicle path into account. For computing the visual range ascertained in this way, in addition to a piece of information concerning the roadway topology, a piece of information concerning a light distribution, for example a standard projection onto a wall at a distance of 25 meters, or the like may be used. Alternatively, model assumptions may be utilized, for example a flat topology or light distribution models based on an average headlight, in order to reduce computing requirements for computing the visual ranges.

Figure 3:
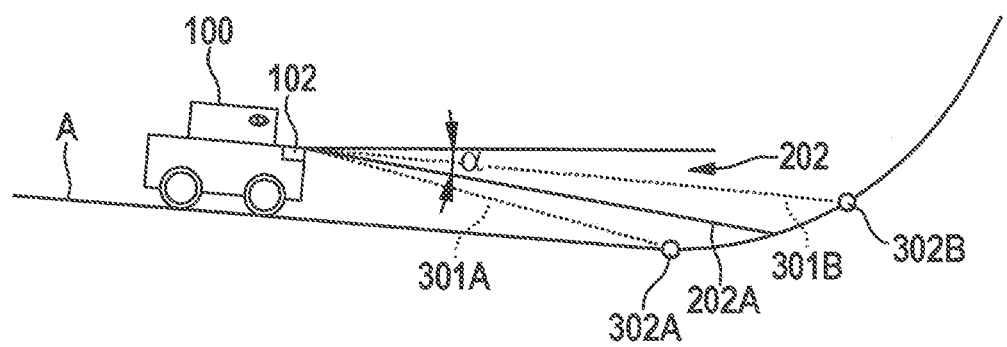
FIG. 3 shows a schematic illustration of the vehicle from FIG. 1 in a surroundings.

FIG. 3 shows a schematic illustration of vehicle 100 from FIG. 1 in a surroundings. The illustration in FIG. 3 is similar to the illustration from FIG. 2. Due to the illustration and for the sake of clarity, FIG. 3 shows only one headlight 102 of vehicle 100, vehicle 100 being shown in a side view. Vehicle 100 is situated on roadway A. Roadway A has an uphill grade in the forward travel direction ahead of vehicle 100. In addition, FIG. 3 illustrates a characteristic, generated by headlight 102, of a light distribution or light emission 202 in the form of a light cone having a beam angle α and a light-dark cutoff 202A. In addition, FIG. 3 depicts a first vision beam 301A, a second vision beam 301B, a first test point 302A, and a second test point 302B. First vision beam 301A extends between headlight 102 of vehicle 100 and first test point 302A, which is situated on roadway A at a first distance from vehicle 100. Second vision beam 301B extends between headlight 102 of vehicle 100 and second test point 302B, which is situated on roadway A at a second distance from vehicle 100 which is greater than the first distance. First test point 302A is thus situated on roadway A between vehicle 100 and second test point 302B. Light-dark cutoff 202A of light emission 202 or of the light cone strikes roadway A between first test point 302A and second test point 302B. FIG. 3 depicts how the ascertainment unit of the setting device of vehicle 100 may ascertain a visual range.

Thus, FIG. 3 shows a possible intermediate step in computing a geometric visual range, with an iterative method for ascertaining a visual range with the aid of the ascertainment unit of the setting device of vehicle 100. First vision beam 301A between first test point 302A and headlight 102 is ascertained, and an angle in relation to vehicle 100 is computed. The angle is subsequently compared to beam angle α, for example typically 0.57 degree for low-beam light. If the angle is less than beam angle α or first test point 302A between vehicle 100 and light emission 202 or light-dark cutoff 202A, as is the case in FIG. 3, a relevant area of roadway A is then illuminated by low-beam light, for example, and the visual range extends to at least first test point 302A. If a further angle of second vision beam 301B, which extends between second test point 302B and headlight 102, is outside or above beam angle α or light-dark cutoff 202A, second test point 302B is not sufficiently illuminated, and no longer belongs to an area of the visual range. The visual range for low-beam light therefore ends, in a first approximation, at first test point 302A. The option provided here for computing the visual range is merely an example. Further options are discussed in greater detail below as examples. In the present invention, there is no limitation to a specific type of computation.

According to one exemplary embodiment and with reference to FIGS. 2 and 3, the ascertainment unit of the setting device of vehicle 100 is configured for using navigation data for ascertaining the visual range. Use may take place for classical high beam assists or for discrete light distributions, but is not limited to such light distributions. According to one exemplary embodiment, the navigation data are utilized by the ascertainment unit in order to compute or ascertain a possible geometric visual range. For this purpose a so-called most probable path (MPP), for example, is evaluated. This MPP represents an area of a roadway network on which vehicle 100 will travel with a high degree of probability, and is determinable, for example, by entering a destination or evaluating roadway classes. The MPP may be utilized as a trajectory which is further evaluated. For example, a viewing angle or vision beam 301A, 301B of a test point 302A, 302B on the trajectory with respect to headlights 102 may be ascertained at points on the trajectory and compared to beam angles α of different characteristics of light distribution 202. If the viewing angle of a test point 302A, 302B is greater than beam angle α of light-dark cutoff 202A, the visual range of light distribution 202 ends there, as is apparent in FIG. 3, for example. If a vision beam 301A, 301B between trajectory point or test point 302A, 302B and headlight 102 or a vision beam 204 originating from the driver's eye intersects the trajectory, the visual range ends at the intersection point, for example at contact point 204A, as is apparent in FIG. 2, for example. The visual range difference may be ascertained in this way. Based on differences between low-beam light and high-beam light ascertained in this way, for example, a waiting time period between low-beam light and high-beam light to be set may be determined in particular in a lookup table. Alternatively or additionally, taking the visual range or topology-related visual range into account may be easily integrated into an existing headlight system by setting a waiting time offset set instead of an absolute waiting time period, or by setting a factor for shortening or extending the waiting time period. Extending the waiting time period is advantageous when the visual range difference or a visual range difference between low-beam light and high-beam light, for example, is small. Similarly, shortening the waiting time period for a large visual range difference between low-beam light and high-beam light is advantageous.

Figure 4:
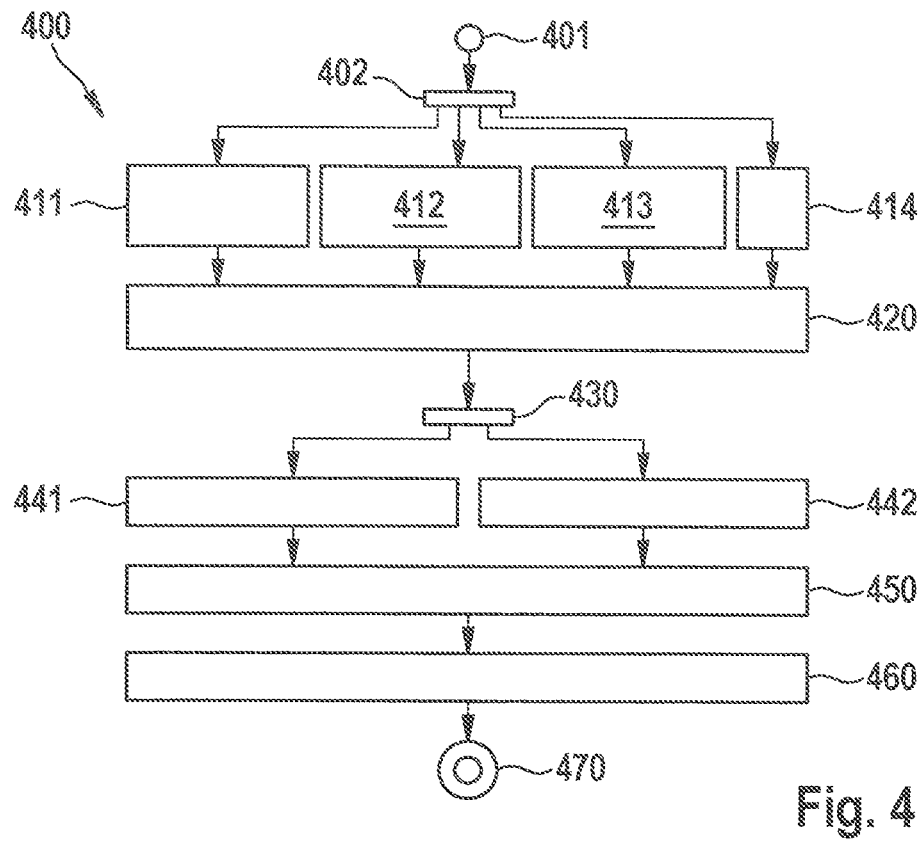
FIG. 4 shows a flow chart of a process according to one exemplary embodiment of the present invention.

FIG. 4 shows a flow chart of a process 400 according to one exemplary embodiment of the present invention. Process 400 may be carried out to set a characteristic of a light emission of at least one headlight of a vehicle. Process 400 may be carried out in conjunction with a vehicle such as the vehicle from FIGS. 1 through 3, or in conjunction with a setting device such as the setting device from FIG. 1. In addition, process 400 is similar to the method described for FIG. 5, and may be carried out in conjunction with same.

According to the exemplary embodiment of the present invention illustrated in FIG. 4, an example of a sequence of process 400 is illustrated in FIG. 4. Process 400 begins at a starting point 401, from which execution of process 400 arrives at a branch block 402. From branch block 402, process 400 arrives, solely as an example, at four blocks 411, 412, 413, and 414, connected in parallel, in which surroundings data are received. Navigation data are received in block 411, surface data being received in block 412, lane data being received in block 413, and block 414 representing reception of further surroundings data. Thus, surroundings data which may originate from various sources, for example navigation data from a navigation device, surface data and lane data of a vehicle camera, etc., are received in a first step of process 400.

From each of blocks 411, 412, 413, and 414, process 400 crosses over to a block 420 in which a topology or topology data is/are computed or determined. A topology of a roadway or street is determined, for example by sensor data fusion based on the surroundings data. This may be, for example, an internal representation by space curve segments along which the vehicle moves or is going to move.

From block 420, process 400 arrives at a branch block 430 at which process 400 branches into two blocks 441 and 442 connected in parallel, in which a visual range is separately computed or estimated for each light distribution, using the topology data and information concerning light distributions, for example low-beam light and high-beam light. Thus, for example, a visual range for low-beam light is estimated in block 441, and a visual range for high-beam light is estimated in block 442.

From each of blocks 441 and 442, process 400 crosses over to a block 450 in which a visual range difference is ascertained. Process 400 subsequently arrives at a block 460 in which a waiting time or waiting time period or a so-called debouncing time is ascertained and set. The waiting time for turning the headlights back up is thus set, using the ascertained difference of the visual ranges or the ascertained visual range difference. Process 400 subsequently terminates, or process 400 is carried out again.

In principle, pieces of information may be combined at different points in process 400. For example, using data of each individual data source, a potential visual range or a potential visual range difference may be ascertained and subsequently utilized for setting the waiting time period. However, a fusion to form shared topology data or a shared roadway topology is advantageous, since a computation may be expanded to various sources without having to make changes in subsequent process 400 or algorithm.

According to one exemplary embodiment, surroundings data are received from various data sources, for example a navigation device and/or a camera system and/or some other communication interface, for example a communication bus internal to the vehicle. Navigation data may represent a route, but also particular features of a segment, for example the presence of a traffic circle on the segment. A vehicle camera may ascertain, for example, measuring information concerning a surface pattern, for example with regard to a hilltop, depression, or the like, and/or lane information, and provide same to process 400. Information from recognized signs, for example warnings of a sharp curve ahead of the vehicle, may likewise be utilized. Recognized reflectors on the roadside may likewise supply information concerning the course of the roadway ahead of the vehicle. Information from other vehicles (so-called "Car2car") may be obtained via further communication channels, such as an air interface, for example, in particular radio signals or light signals, or information concerning the course of the roadway ahead of the vehicle may be obtained indirectly from the infrastructure such as radio towers (so-called "Car2infrastructure"; in general "Car2x"). A proper motion and other signals of the vehicle on which process 400 is carried out may be received via a bus system or the like internal to the vehicle. Via the proper motion, it may be ascertained, for example, whether the vehicle is in a sharp curve or is about to turn, which is ascertainable via a blinker signal, for example.

Based on the surroundings data of various data sources ascertained in this way, topology data in particular regarding a roadway topology may be determined via data fusion. For various light distributions, for example low-beam light and high-beam light, in each case a topology-related possible visual range may be computed or estimated by use of the topology data. A geometric visual range may advantageously be computed in order to keep the complexity of computing operations low. If necessary, a visual range may be computed or estimated based on a roadway condition, for example based on a degree of reflection, and the light distribution, for example isolux lines. For this purpose, it is not necessary to use just an intersection point with the roadway surface; instead, other intersection points in parallel to the roadway may also be taken into account. In addition to the light distributions of low-beam light and high-beam light, further light distributions may also be assessed, for example intermediate stages between low-beam light and high-beam light in the case of an adaptive light-dark cutoff, or light distributions of glare-free high-beam light systems, for example vertical light-dark cutoff, matrix beam, pixel light, or the like. For simplified computations, the visual range may be limited to a maximum visual range, for example 200 meters, for example in the case of a lack of an intersection point of the light distribution with the roadway surface, for high-beam light. The visual range may be ascertained, for example, by evaluating the geometric intersection point of the light-dark cutoff of the headlight with the roadway surface, or ascertaining the tangent of the vision beam of the driver, or also of a driver assistance sensor such as a vehicle camera, to the roadway surface, as illustrated in FIG. 2, for example.

The particular difference between the light distributions is ascertained from the visual ranges ascertained in this way.

The visual range differences are analyzed. For example, according to the exemplary embodiment of the present invention illustrated in FIG. 4, the visual range difference between low-beam light and high-beam light is analyzed. If the visual range difference is large, a short waiting time between low-beam light and high-beam light is selected. As a result, the driver quickly has an advantage in the range of vision. However, if the visual range difference is small, a longer waiting time or debouncing time is selected in order to slowly select a transition between low-beam light and high-beam light, and thus avoid discomfort due to rapid changes in the light distribution.

According to one exemplary embodiment, a continuous evaluation of the visual range may take place in order to be able to respond to changes in the topology of the surroundings. Alternatively, to save computing resources, the visual range may be computed once, in particular at the point in time when the headlights are dimmed, as well as the minimum settable waiting time period, which would be the first possible point in time for turning up the headlights, which may then be further delayed if necessary. In adaptive systems, which have quasi-continuous state transitions of the light distributions, the waiting time period may be established in the form of controller parameters, for example. For a large visual range difference, a controller may be set in such a way that a target light distribution or target light emission is quickly achieved. For a small visual range difference, a large time constant may be selected in order to not distract the driver by rapid changes in the light distribution.

According to another exemplary embodiment, in addition to the geometric visual range, a meteorological visual range may be used to include effects such as fog, haze, rain, etc., in the ascertainment of the visual range difference. In such a case, a computation of the visual ranges for high-beam light and low-beam light may take place in such a way that reflections of emitted light on the atmosphere may be taken into account. Depending on available system resources, different forms are possible: A more complex system may be, for example, an atmospheric dispersion model with actually measured headlight light distributions; a simpler system may be implemented, for example, by adapting the geometric visual range to the meteorological visibility conditions by adapting the visual range as a function of the atmospheric conditions and the beam angle, in which case the geometric visual range of high-beam light may be reduced to a greater extent than the geometric visual range of low-beam light in order to ascertain the visual range, taking the meteorological visual range into account. In one simple configuration, this may be selected by a reduction by a fixed factor as a function of the light distribution.

In adaptive systems having quasi-continuous light distributions, according to one exemplary embodiment, controllers may be adjusted in order to set a constant duration for achieving a target visual range. In order to not have a duration that is too long for small differences between target visual ranges, and thus, generally small differences between the target light distributions, a minimum speed may be used. Most drivers perceive small changes in the light distribution less clearly than large changes; i.e., for large changes, more attention should be paid to the discomfort of the driver, and, for example, a process such as the process from FIG. 4 should be carried out.

Figure 5:
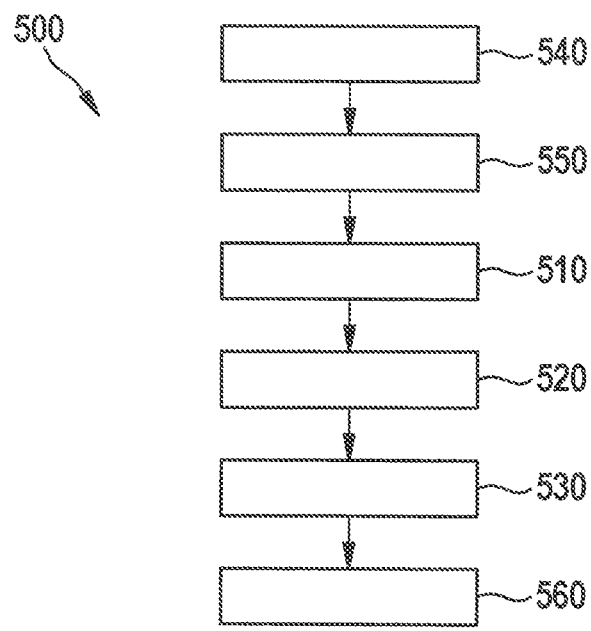
FIG. 5 shows a flow chart of a method according to one exemplary embodiment of the present invention.

FIG. 5 shows a flow chart of a method 500 according to one exemplary embodiment of the present invention. Method 500 may be carried out in order to set a characteristic of a light emission of at least one headlight of a vehicle. Method 500 may be carried out in conjunction with a vehicle such as the vehicle from FIGS. 1 through 3, or in conjunction with a setting device such as the setting device from FIG. 1. In addition, method 500 is similar to the process described for FIG. 4, and may be carried out in conjunction with same.

Method 500 includes a step 510 of reading in topology data which represent a topology of the surroundings of the vehicle. A value of a visual range difference between a topology-related first visual range which is associated with a first characteristic of the light emission, and a topology-related second visual range which is associated with a second characteristic of the light emission, is ascertained in a subsequent step 520 of ascertaining, using the topology data. A value of a waiting time period for changing a characteristic of the light emission as a function of the visual range difference is adapted in a step 530 of adapting, which may be carried out subsequent to step 520 of ascertaining. The characteristic of the light emission is thus settable as a function of topology-related visual range differences by carrying out method 500.

According to one exemplary embodiment, prior to step 510 of reading in, method 500 includes a step 540 of receiving, followed by a step 550 of determining. The surroundings data from at least one interface with a position detection unit, a vehicle camera, a data transmission unit, a surroundings detection unit, and additionally or alternatively, a travel data detection unit of the vehicle, are received in step 540 of receiving. The topology data are determined in step 550 of determining. The topology data are determined using surroundings data which represent at least one property of the surroundings of the vehicle. After step 530 of adapting, method 500 in particular also includes a step 560 of changing, in which the characteristic of the light emission is changed in a discrete or continuous state transition as a function of the adapted waiting time period or as a function of the ascertained visual range difference and the adapted waiting time period.

Alternatively, at least one further visual range difference is also ascertained in step 520 of ascertaining. The at least one further visual range difference between the first visual range or the second visual range, and at least one further visual range which is associated with a further characteristic of the light emission which is different from the first characteristic and the second characteristic, or between at least two further visual ranges which are associated with different further characteristics of the light emission which are different from the first characteristic and the second characteristic, is ascertained. The waiting time period is adapted in step 530 of adapting as a function of an absolute value maximum visual range difference between the visual range difference and the at least one further visual range difference.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment. Furthermore, the method steps provided here may be repeated, and carried out in a sequence different from that described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for setting a characteristic of a light emission of at least one headlight of a vehicle, the method comprising:

identifying a static topology condition, which represents a topology of the surroundings of the vehicle;

ascertaining a visual range difference between a topology-related first visual range which is associated with a first characteristic of the light emission, and a topology-related second visual range which is associated with a second characteristic of the light emission, using the static topology condition; and adapting a waiting time period for changing a characteristic of the light emission as a function of the visual range difference.

2. The method of claim 1, wherein the waiting time period is set to a first waiting time period in the step of adapting when a magnitude of the visual range difference is less than a threshold value, and the waiting time period is set to a second waiting time period when a magnitude of the visual range difference is greater than the threshold value, the first waiting time period being longer than the second waiting time period.

3. The method of claim 1, wherein a target characteristic for changing a characteristic of the light emission is adapted as a function of the visual range difference in the adapting.

4. The method of claim 1, wherein the topology-related visual ranges are determined in the ascertaining, using at least one of:
a geometric range of the at least one headlight,
a light distribution of the at least one headlight,
a beam angle of the at least one headlight,
a geometric visibility distance,
a recognizability distance, and
navigation data.

5. The method of claim 1, wherein at least one further visual range difference is ascertained in the ascertaining, the at least one further visual range difference between the first visual range or the second visual range and at least one further visual range, which is associated with a further characteristic of the light emission which is different from the first characteristic and the second characteristic, or between at least two further visual ranges, which are associated with different further characteristics of the light emission which are different from the first characteristic and the second characteristic, being ascertained, the waiting time period being adapted in the adapting as a function of an absolute value maximum visual range difference from the visual range difference and the at least one further visual range difference.

6. The method of claim 1, further comprising:
determining the static topology condition, the static topology condition being determined using surroundings data which represent at least one property of the surroundings of the vehicle.

7. The method of claim 6, further comprising:
receiving the surroundings data from at least one of:
a position detection unit,
a data transmission unit,
a surroundings detection unit, and
a travel data detection unit of the vehicle.

8. The method of claim 1, further comprising:
changing the characteristic of the light emission as a function of the adapted waiting time period or as a function of the ascertained visual range difference and the adapted waiting time period in a discrete or continuous state transition, the characteristic of the light emission being changed from the first characteristic to the second characteristic, or to a further characteristic which is different from the first characteristic and the second characteristic, or from the second characteristic to the first characteristic or to a further characteristic which is different from the first characteristic and the second characteristic, or from a further characteristic, which is different from the first characteristic and the second characteristic, to the first characteristic or to the second characteristic, or between different further characteristics which are different from the first characteristic and the second characteristic.

9. The method of claim 1 further comprising:
identifying a visual condition caused by a second vehicle, wherein the adapting adjusts the waiting time period based additionally on the visual condition.

10. A control unit for setting a characteristic of a light emission of at least one headlight of a vehicle, comprising:
a reading arrangement to identify a static topology condition, which represents a topology of the surroundings of the vehicle;
an ascertaining arrangement to ascertain a visual range difference between a topology-related first visual range which is associated with a first characteristic of the light emission, and a topology-related second visual range which is associated with a second characteristic of the light emission, using the static topology condition; and
an adapting arrangement to adapt a waiting time period for changing a characteristic of the light emission as a function of the visual range difference.

11. A non-transitory computer readable medium having computer readable instructions stored therein
for setting a characteristic of a light emission of at least one headlight of a vehicle, when the computer readable instructions are executed, a computing device performs the following:
identifying a static topology condition, which represents a topology of the surroundings of the vehicle;
ascertaining a visual range difference between a topology-related first visual range which is associated with a first characteristic of the light emission, and a topology-related second visual range which is associated with a second characteristic of the light emission, using the static topology condition; and
adapting a waiting time period for changing a characteristic of the light emission as a function of the visual range difference.

12. The non-transitory computer readable medium of claim 11, wherein the waiting time period is set to a first waiting time period in the step of adapting when a magnitude of the visual range difference is less than a threshold value, and the waiting time period is set to a second waiting time period when a magnitude of the visual range difference is greater than the threshold value, the first waiting time period being longer than the second waiting time period.

* * * * *